(12) United States Patent
Benny (10) Patent No.: US 10,482,005 B1
(45) Date of Patent: Nov. 19, 2019

(54) METHOD AND APPARATUS FOR DEVELOPER CODE RISK ASSESSMENT

(71) Applicant: EMC IP Holding Company LLC, Hopkinton, MA (US)

(72) Inventor: Anilkumar Benny, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/716,223

(22) Filed: Sep. 26, 2017

(51) Int. Cl.
*G06F 9/44* (2018.01)
*G06F 11/36* (2006.01)

(52) U.S. Cl.
CPC ...... *G06F 11/3688* (2013.01); *G06F 11/3684* (2013.01)

(58) Field of Classification Search
CPC .................. G06F 11/3684; G06F 11/3688
USPC .......................................... 717/124
See application file for complete search history.

(56) References Cited

U.S. PATENT DOCUMENTS

| | | | | |
|---|---|---|---|---|
| 6,502,102 B1* | 12/2002 | Haswell | ............. | G06F 11/3664 |
| 6,601,192 B1* | 7/2003 | Bowman-Amuah | ...................... | |
| | | | | G06F 11/3688 |
| | | | | 714/38.12 |
| 6,907,546 B1* | 6/2005 | Haswell | ............. | G06F 11/3684 |
| | | | | 714/38.11 |
| 2004/0260974 A1* | 12/2004 | Livshits | ................... | G06F 8/71 |
| | | | | 714/19 |
| 2006/0064623 A1* | 3/2006 | Fischer | .............. | G06F 11/0709 |
| | | | | 714/758 |
| 2007/0033659 A1* | 2/2007 | Hoche | ..................... | G06F 8/443 |
| | | | | 726/28 |
| 2010/0083233 A1* | 4/2010 | Vanoverberghe | ... | G06F 11/3612 |
| | | | | 717/126 |
| 2012/0222014 A1* | 8/2012 | Peretz | ................ | G06F 11/3684 |
| | | | | 717/125 |
| 2013/0298110 A1* | 11/2013 | Boden | ................ | G06F 11/3676 |
| | | | | 717/125 |
| 2014/0279837 A1* | 9/2014 | Guo | ....................... | G06F 16/282 |
| | | | | 707/603 |
| 2014/0298295 A1* | 10/2014 | Overbeck | .......... | G06F 9/44547 |
| | | | | 717/124 |
| 2014/0380486 A1* | 12/2014 | Brucker | ................ | G06F 21/577 |
| | | | | 726/25 |
| 2015/0033212 A1* | 1/2015 | Mizobuchi | ........... | H05K 999/99 |
| | | | | 717/131 |
| 2015/0095877 A1* | 4/2015 | Lin | .......................... | G06F 8/36 |
| | | | | 717/104 |

(Continued)

OTHER PUBLICATIONS

Title: Continuous Integration; author: M Fowler et al publushed on 2006.*

(Continued)

*Primary Examiner* — Chameli Das
(74) *Attorney, Agent, or Firm* — Workman Nydegger; Carl T. Reed (57) ABSTRACT

One example method involves generating executable code, mapping a testcase to the executable code, where the testcase is associated with a test, identifying a dependent code component, notifying an owner of the dependent code component of a relation between the dependent code component and the executable code, initiating a test of the executable code, and resolving any problems that are identified during the test of the executable code. In this example, the entire method is performed during a code development phase.

19 Claims, 4 Drawing Sheets

(56) References Cited

U.S. PATENT DOCUMENTS

| | | | |
|---|---|---|---|
| 2015/0269060 A1* | 9/2015 | Rodmell | G06F 11/3664 |
| | | | 717/124 |
| 2015/0339207 A1* | 11/2015 | Hod | G06F 11/3409 |
| | | | 717/124 |
| 2016/0026230 A1* | 1/2016 | Overbeck | G06F 9/44547 |
| | | | 713/320 |
| 2016/0054983 A1* | 2/2016 | Balasubramanian | G06F 8/30 |
| | | | 717/113 |
| 2016/0170863 A1* | 6/2016 | Finnie | G06F 11/3664 |
| | | | 717/131 |
| 2017/0315801 A1* | 11/2017 | Fullbright | G06F 8/70 |

OTHER PUBLICATIONS

Title: Gandalf: Software development environments; author: AN Habermann et al, publushed 1986.*

* cited by examiner

METHOD AND APPARATUS FOR DEVELOPER CODE RISK ASSESSMENT

FIELD OF THE INVENTION

Example embodiments of the invention relate to systems and methods relating to the development of code. More particularly, at least some embodiments of the invention relate to systems and methods for identifying, assessing, and resolving any risks that may attend the use of particular code.

BACKGROUND

Development of computer code, such as for a software product, often involves the work of multiple developers who may or may not have significant interaction with each other, and who may be geographically dispersed. Considerations such as these may lend significant complexity to the development process because it is difficult for the developers to interact with each other, and to coordinate their respective efforts.

Related technological problems with typical coding processes concern the fact that it is often the case that some portions of code in development rely on, or otherwise relate to, other portions of code that are also in development. That is, the various code portions being developed are interrelated with each other in some way. Consequently, the code being developed by one developer can cause errors and other problems in the software product if the relation between the code portions is not properly accounted for. To illustrate, a code development environment may employ a variety of different teams, totaling over 100 developers, with each team writing code and adding new tests. As a result, it is challenging to integrate and add regression to existing code during development. As well, if one or more regression defects are found, it is time consuming to revise the code and execute any applicable tests on the revised code.

Still another technological problem commonly encountered in typical code development processes and environments is that it is difficult, or impossible, to determine what the effect of a change in one code portion will have on other, related, code portions. That is, developers lack effective tools to determine what the potential risks are to other portions of the software if a change is made to code being written by that developer.

A related technological problem presented by typical code development processes and environments is that a developer generally does not have a way to usefully interact with owners of dependent code portions to assess risks of code changes implemented by the developer. Thus, developers may simply have to make their best guess as to what the impact might be that results from changes that they are planning to implement in the portion of code that they are developing.

As well, due to technological problems such as those already noted, and others, testing of code often does not take place until after the various code portions have been submitted by developers for inclusion in the software product. As a result, problems in the software portions may not come to light until a relatively late stage in the development process.

Moreover, the testing approach noted above has proven problematic as well. In particular, it is often the case that multiple test procedures are developed and implemented that are duplicates of each other. Thus, time and effort are wasted on development and use of test procedures that are not needed.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Example embodiments of the invention generally relate to systems and methods for managing data. More particularly, at least some embodiments of the invention concern systems, hardware, software, computer-readable media, and methods directed to identifying, assessing, and/or resolving any risks that may arise or become apparent during code development and testing. In more detail, example embodiments embrace methods for developer code risk assessment, automatically identifying dependent component owners for review and execution of only valid testcases for any particular code change or code addition, along with filtering unwanted and duplicate tests out of the system, so as to improve efficiency in the software development life cycle before code is submitted for release.

In light of the technological problems noted herein, and others, what is needed are ways to improve code development and testing processes so that a developer can interact with other developers during a code development process to identify and resolve actual and/or potential problems at a relatively early stage in the development process. It would further be advantageous for a developer to be able to identify, during a code development process also involving other developers, problems that may occur concerning the interaction of related code portions respectively created, or in development, by each developer. It would further be advantageous for the developer to be able to assess and resolve risks during the code development process, rather than after the code produced by the developer has been completed. As well, it would be advantageous to perform code testing during the development process, rather than after development is complete. Finally, it would be advantageous to avoid the creation and performance of duplicative testing processes.

Thus, at least some embodiments of the invention may solve one or more of the technological problems noted herein by providing processes for notifying dependent code owners of code changes that may affect code that those dependent code owners are developing. Processes within the scope of the invention also employ live analytics to advise developers of risks involved, dependent components, and testcases impacted, before the developers submit their code.

As well, embodiments disclosed herein provide for association of new and modified code that is in development with test processes and other evolutions. For example, a line of code may be mapped against all the testcases, including testcases associated with dependent components, that execute that line of code. Thus, the developer is able to determine, during the development process prior to code submission, whether that line of code presents any problems or risks, as well as what the risks and problems may be. In this way, problems can be identified and resolved at a relatively early stage, thus reducing or eliminating extensive testing and rework that would otherwise be needed after the code has already been submitted.

Finally, insofar as embodiments of the invention enable developers to associate their code with evolutions such as test processes, analyses may be performed to determine whether or not a new or modified test process or procedure is needed for that code, or whether an existing process may be used. Thus, embodiments of the invention may help to reduce, or eliminate, the creation and execution of redundant testing processes.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a code development environment. Any of the devices, including the clients, servers and hosts, in the operating environment can take the form of software, physical machines, or virtual machines (VM), or any combination of these, though no particular device implementation or configuration is required for any embodiment. Similarly, code development system components such as databases, development clients, test servers, code review applications, code review servers, development applications, code review engines, test engines, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Figure 1A:
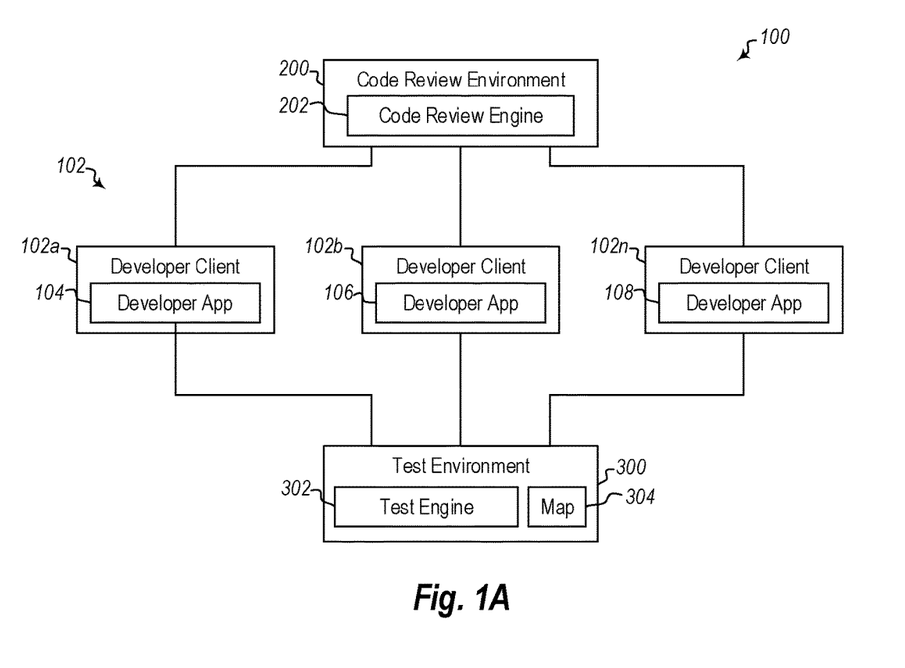
FIG. 1a discloses an example of an operating environment in which processes for identifying, assessing, and resolving risks associated with the use of new or modified code may be performed.

With reference now to FIG. 1a, details are provided concerning aspects of an operating environment for at least some embodiments of the invention, one example of which is denoted generally at 100. The operating environment 100 may comprise, or consist of, a networked operating environment such as a LAN or WAN for example. Some, or all of the example operating environment 100 may be in the form of a cloud based network. Thus, communication between and among elements of the example operating environment 100 may take place by way of network connections. As well, the elements of the example operating environment 100 may be located at a single physical location, or may be geographically dispersed. Any of the components of the example operating environment may include a user interface (UI), such as a command line interface (CLI) or graphical user interface (GUI) for example, by way of which a user can perform, or cause the performance of, operations concerning or involving those components.

In general, various code development and testing operations, among others, can be performed in the operating environment 100. Such operations may include, for example, developing, modifying and testing code, such as code that is, and/or will be, employed as part of one or more backup and/or restore applications, for example. Other example operations that may be performed in the operating environment 100 include associating testcases with code portions, developing and modifying code test procedures, identifying and deleting redundant test procedures, communicating information between and among code development platforms, and communicating with a code review environment and a test environment. These operations are presented only by way of example and are not intended to limit the scope of the invention in any way.

At least some embodiments of the operating environment 100 may be employed in connection with a Scrum approach to software development. In general, Scrum refers to a framework that may be used to manage software development in an iterative and incremental fashion. The scope of the invention is not limited to the Scrum approach however, nor is there a requirement that the operating environment 100 comprise, or be used in connection with, a Scrum approach to development.

The example operating environment 100 may include any number of development clients 102, such as clients 102a, 102b . . . 102n, that each host a developer application 104, 106 or 108. In general, the developer applications 104, 106 and 108 are not limited to any particular functionality or type of functionality. Example developer applications 104 . . . 108 include, but are not limited to, applications for creating, modifying and deleting executable computer code, which may be referred to herein simply as 'code.' Various types of code can be created using the developer applications 104 . . . 108. By way of example, one or more of the developer applications 104 . . . 108 may be used in connection with the creation of executable code for backup and restore applications, that is, executable application code. Thus, in some example embodiments, executable application code for use as part of the Dell-EMC Data Domain data protection environment may be created and/or modified by way of one or more of the developer applications 104 . . . 108. However, the developer applications 104 . . . 108 are not limited to development of backup and restore application code, but extend more generally to the development of any type of executable application code. In connection with the creation of executable application code, the developer applications 104 . . . 108 may comprise or employ any type of programming language.

As further indicated in FIG. 1a, the operating environment 100 includes a code review environment 200 that includes a code review engine 202 which may perform some, or all, of the functions of the code review environment 200. In general, the code review environment 200 communicates with the developer clients 102 and enables and/or implements a variety of different functions relating to the code development process, some examples of which are discussed elsewhere herein. By way of illustration, the code review environment 200 may collect, and provide access to, information needed by a developer using a developer client 102 concerning code components generated, or being generated, by one or more other developers.

This information can be obtained on the initiative of a development client 102, such as by downloading automatically, or ad hoc, from the code review environment 200, and/or the code review environment 200 can push information down to one or more development clients 102. For example, the code review environment 200 may receive information from a developer, evaluate that information, and then forward the information to one or more other developers. Depending upon the embodiment, these processes may be performed by the code review environment 200 automatically, or on an ad hoc basis. As well, a developer client 102 may periodically, or ad hoc, query the code review environment 200 for any changes affecting a code component being created by a developer. In some embodiments, the query is performed automatically. As well, a developer client 102 may be notified by the code review environment 200 when the code review environment 200 receives information that is needed by the developer client 102. After notification, the developer client 102 may then communicate with the code review environment 200 to obtain the information.

The example operating environment 100 further includes a test environment 300 having a test engine 302 which may perform some, or all, of the functions of the test environment 300. The test environment 300 may also include a map 304 which includes information that correlates, or maps, one or more tests to one or more code components.

In general, the test environment 300 communicates with the developer clients 102 and enables and/or implements a variety of different functions relating to the testing processes related to code components developed by the developer clients 102, some examples of which are discussed elsewhere herein. By way of illustration, the test environment 300 may collect, and provide access to, information needed by a developer using a developer client 102 concerning code components generated, or being generated, by one or more other developers.

This information can be obtained on the initiative of a development client 102, such as by downloading automatically, or ad hoc, from the test environment 300, and/or the test environment 300 can push information automatically, or ad hoc, down to one or more development clients 102. For example, the test environment 300 may receive information from a developer, evaluate that information, and then forward the information to one or more other developers. Depending upon the embodiment, these processes may be performed by the test environment 300 automatically, or on an ad hoc basis. As well, a developer client 102 may periodically, or ad hoc, query the test environment 300 for any tests or test information affecting a code component being created by a developer. In some embodiments, the query is performed automatically. As well, a developer client 102 may be notified by the test environment 200 when the test environment 300 receives tests or test information that is needed by the developer client 102. After notification, the developer client 102 may then communicate with the test environment 300 to obtain the information.

More particular details concerning an example test environment and an example code review environment are set forth below. In some embodiments, the test environment and the code review environment are combined together in a single environment. It should be noted that while the disclosure indicates certain functions as respectively allocated to the test environment and the code review environment, such allocation is provided by way of example and is not intended to limit the scope of the invention in any way.

B. Example Code Review Environment

With continued reference to FIG. 1a, and the code review environment 200 in particular, one or more of the development clients 102, such as development client 102a for example, may communicate with the code review environment 200 in order to obtain and/or provide information that identifies one or more relationships between a code component created, or in the process of being created, at the development client 102a and/or one or more other code components which may have been developed, or are under development, at one or more other development clients 102, such as development client 102b for example. The code relationship information can be stored at, or by, the code review environment 200, such as in a database for example.

One example of such code relationship information is dependency information. To briefly illustrate with an example, a first code component developed at a first development client 102a may invoke, but not include, a routine that is part of a second code component under development at a second development client 102b. In this example, the first code component is dependent upon the second code component, that is, the operation of the first code component is a function of, or depends upon, the operation of the second code component. Depending upon the circumstances, the second code component may, or may not, be dependent upon the first code component. Thus, code components that depend upon one or more other code components may be referred to herein as dependent code components.

With these points in mind, one type of dependency information is information that identifies one or more code components, such as a code component 'A' for example, upon which another particular code component, such as code component 'B' for example, depends. Another form of dependency information is information that identifies one or more code components, such as a code component 'C' for example, that depend upon another particular code component, such as code component 'B' for example. As will be apparent from the foregoing examples, while a code component may be a dependent code component, it may also be the case that one or more other code components depend from that same dependent code component.

In general then, the relationship information obtained in connection with development of a code component provides the developer, or developers, with an awareness of the relationship if any, between or among two or more code components. This information can then be used by the developer(s) in identifying and assessing possible impacts and risks that may be associated with a code component that the developer is creating.

For example, the relationship information can be used by a developer as a basis for notifying owners of dependent, or otherwise related, code components. Such notifications may take place by way of the code review environment 200.

More generally, communications between development clients 102 may take place by way of the code review environment 200. In this way, the code review environment 200 is aware of relationships between code components under development, and the code review environment 200 can make this relationship information available to developers as needed. As such, the code review environment 200 may serve as a clearinghouse for code component relationship information. Moreover, developers have current information about the relationship of their code component(s) with other code components that are in development.

This relationship information can then be considered by developers as they create code components. That is, the developers have the information needed to determine whether and how their code component may affect one or more other code components. Moreover, the developers can access relationship information during the code development phase so that any problems can be identified and resolved prior to submission of the code for release. Thus, embodiments of the invention may, among other things, help to reduce, or avoid, the occurrence of regression defects, that is, defects that occur as a result of the resolution of another defect.

C. Example Test Environment

Among other things, embodiments of the invention embrace methods by which a developer may determine the risk of adding any code change to the existing product during the coding process and well in advance of submission of the code for release. In at least some embodiments, such methods populate all the testcases/test areas/dependent components, as well as any product use cases impacted by any of the new code or existing code changes. This approach helps with risk assessment, and may also be used to trigger the execution of relevant testcases related to the code change. As well, methods and processes within the scope of the invention may also notify all the dependent component owners for code review, and may trigger flags indicating to product management that a risk assessment should be performed. Thus, embodiments of the invention may be effective in helping to bring the regression defects to zero, or at least reduce regression defects, since all impacted areas will be evaluated during the coding process, rather than after code submission.

The use of live analytics, that is, analytics generated and employed during the code development process, in various embodiments helps to avoid the problem of having to identify and resolve regression defects by letting a developer know the risk involved with including particular code in a code component, and by identifying dependent components, and testcases impacted by the code change before the code is submitted for release. In this way, significant time savings may be achieved, and the processes of identifying and resolving code defects are moved to an earlier point in time, namely, from the code post-submission phase to the code pre-submission phase, that is, the development phase.

Embodiments of the invention also help to avoid running unwanted and duplicate testcases which are not useful or relevant for a specific code change. This may be achieved, for example, by defining and maintaining a path such as: "Usecase"→"component">"testcases"→"code line executed" relation, and building analytics based on this relationship. For example, when a developer writes code for their respective component, the developer may add code and testcases, which may be new or existing testcases, associated with the new line of code. This process of associating the new code/component and tests with each other may be referred to herein as mapping. When the tests of the testcases are executed, the actual line of execution may involve multiple different components from different developers, since the same testcase may have been applied to multiple lines or other portions of code by a variety of different developers. These are the data used for analytics and for risk assessment of the new line of code added by the developer which is populated live, on the fly, when a developer writes a new line of code, or modifies an existing line of code. This data can be used and retrieved with any code coverage tool, where code coverage is a measure that generally refers to the extent to which executable code of a program is executed when a particular test, or suite of tests, is run. In some instances, code coverage can be expressed in terms of the percentage of subroutines or program statements of the program that are called during execution of the test. Some example coverage criteria include function coverage, statement coverage, branch coverage, and condition coverage.

Mechanisms such as the path noted above help to build lines of code or a function mapping against testcases which comes from different component and different usecases. In more detail, the testcases may be mapped against the component against story/usecases/capability, which gives complete visibility of any associated risk, and also indicates the test areas or testcases to trigger for any particular code change which help in precise testing before submission. When new testcases are added, example embodiments can provide information concerning the validity of the test, such as whether the test is a duplicate of an existing test, or simply a test that is not needed because the route path for the test would be the same as the route path for an existing test.

With continued reference now to FIG. 1a, and the test environment 300 in particular, one or more of the development clients 102, such as development client 102a for example, may communicate with the test environment 300 in order to obtain, and/or provide, tests and test information. Test information received from, and/or provided to, one or more development clients 102 may include, for example, information concerning one or more tests identified by a developer as being associated with a code component developed, or under development, by that developer. Such tests may be developed as needed by a developer who is creating a code component, and the tests may be retrievably stored in storage associated with the test environment 300. Storage and retrieval of the tests may be performed by the test engine 302.

As well, a developer may access existing tests and associate one or more existing tests with a code component that is under development. The developer may query the test engine 302 to access information that the developer can then use to determine if an existing test may be adequate for the code written by the developer, or to determine if a new test is needed. If the latter, the developer may then create the needed test.

When the necessary test(s) have been identified, the developer can map the code that the developer has created to the test(s), and the code may also be mapped to a particular component, and a particular use case. If the test that the code is mapped to is an existing test, other developers who have previously mapped their code to that same existing test may be automatically notified, such as by way of the test engine 302, of the new mapping. In this way, the other developers may be made aware that newly written code may impact code that they have written. Additionally, or alternatively, after the developer has mapped new or modified code to a test, the developer may be automatically informed by the test engine 302 of other code that has been mapped to the same test. In this way, the developer may be made aware of potential impacts of the new or modified code on code generated by other developers. As well, mapping of the new or modified code to a component, or usecase, may likewise cause the developer to be automatically informed by the test engine 302 of potential impacts of that new or modified code on components or usecases to which other developers have mapped their code.

Figure 1B:
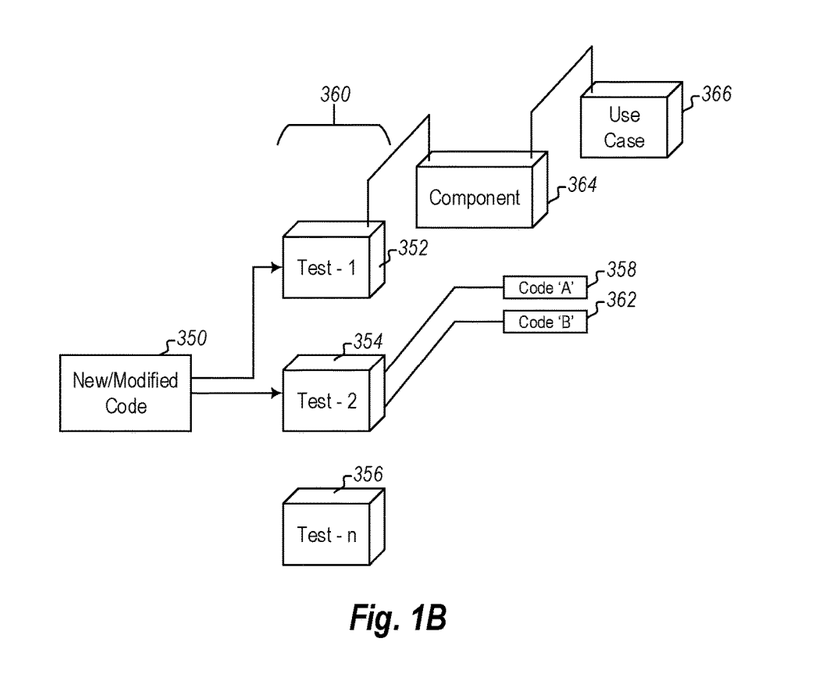
FIG. 1b discloses aspects of some example code and test mappings.

One example mapping arrangement is indicated in FIG. 1b. In particular, new or modified code 350 can be mapped by, or at the direction of, a developer to one or more tests Test-1 352, Test-2 354 and Test-n 356. The tests may collectively form a suite 360 of tests, but that is not necessarily required. As shown, there may not be code mapped to every test. For example, Test-n 356 may be relatively new such that no code has yet been mapped to it. On the other hand, the new or modified code 350 is the only code mapped to Test-1 352, and in addition to the new or modified code 350, code-A 358 and code-B 362 were previously mapped to Test-2 354.

Finally, and as further disclosed in FIG. 1b, a test, such as Test-1 352, may, in turn, be mapped to a component 364 which may in turn be mapped to a use case 366. Multiple tests may be mapped to a component, and multiple components may be mapped to a use case.

Figure 2:
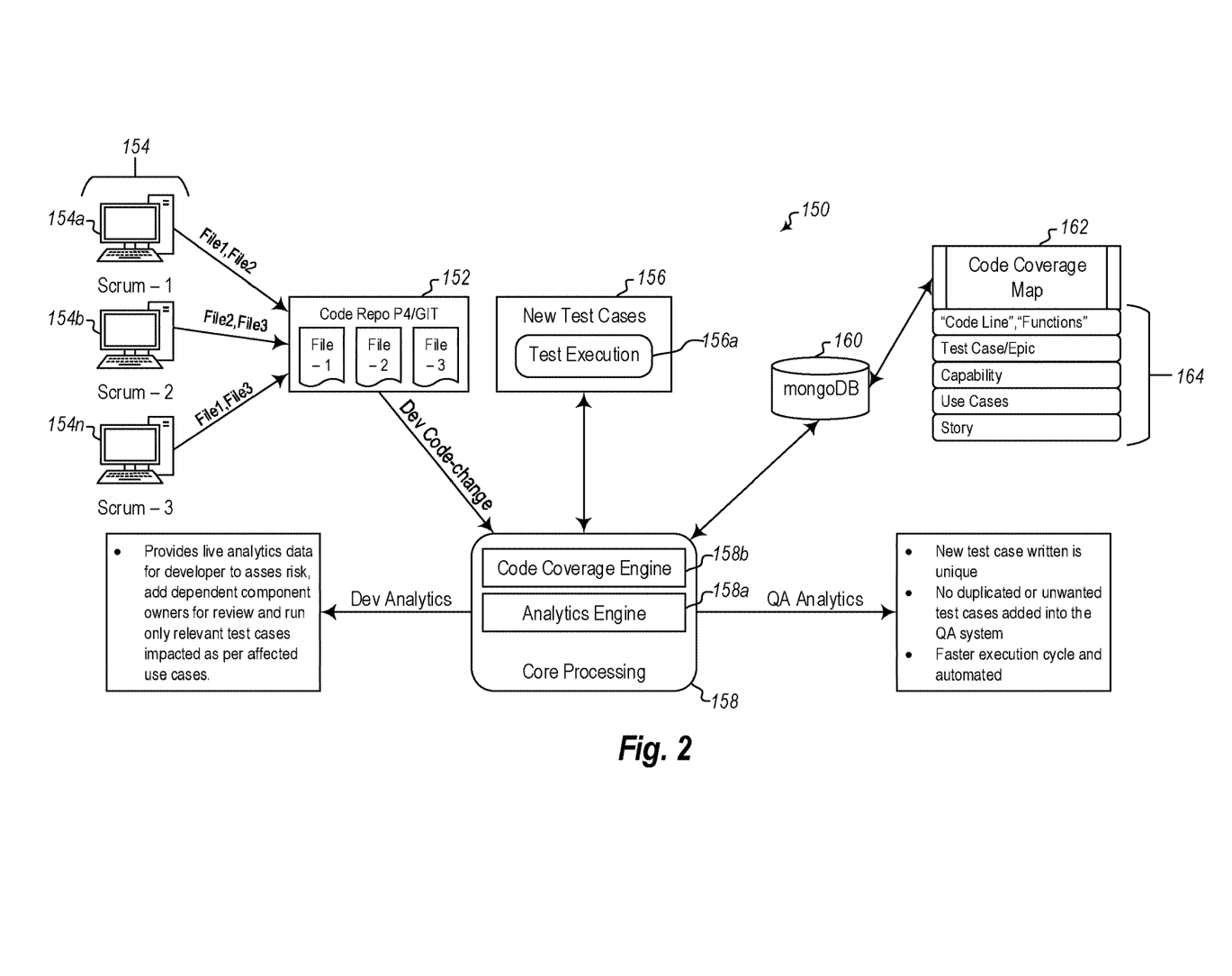
FIG. 2 discloses another example operating environment in which processes for identifying, assessing, and resolving risks associated with the use of new or modified code may be performed.

With reference now to FIG. 2, and continued attention to the discussion of FIGS. 1a and 1b as well, details are provided concerning a specific example implementation of an operating environment for at least some embodiments of the invention, where the example operating environment is referenced generally at 150. As in the case of the operating environment 100, the allocation of various functions among the entities of the operating environment 150 is presented only by way of example and is not intended to limit the scope of the invention in any way. More generally, the functions disclosed herein can be allocated among different, or alternative entities. Thus, the scope of the invention should not be construed to be limited to any particular operating environment, nor to any particular functions or allocation of functions among the entities of an operating environment.

With particular reference now to FIG. 2, the example operating environment 150 may include a code repository 152, which can take the form of a Git-P4 code repository in some embodiments, although that is not necessarily required. In general, the code repository 152 may receive and store new and/or modified code created by, for example, one or more Scrums 154, such as Scrum-1 154a, Scrum-2 154b, and Scrum-3 154n. As indicated, each of the Scrums 154 may be involved in the development of new and/or modified code for code components such as File1, File2 and File3, and multiple Scrums 154 may be involved in the development of code for the same File. For example, both Scrum-1 154a and Scrum-2 154b are involved in generating new and/or modified code for File2. As appropriate, new or modified Files are stored in the code repository 152 and are modified with any new and/or modified code received from one or more of the Scrums 154.

The example operating environment 150 may also include a new testcases module 156 with a test execution module 156a. In general, the test execution module 156a may run tests, which may be new, modified, or existing tests. The tests executed by the test execution module 156a may be identified by a developer in connection with a code development process, as disclosed elsewhere herein.

Both the code repository 152 and the new testcases module 156 may communicate with a core processing module 158 that includes an analytics engine 158a and a code coverage engine 158b. In brief, the code overage engine 158b or other code coverage tool may identify the extent to which executable code of a program, such as code generated by a developer, is/will be executed when a particular test, or suite of tests, identified by a developer, is run by the test execution module 156a. As noted earlier, the same testcase may have been applied to multiple lines or other portions of code by a variety of different developers. Thus, data concerning the various components involved in a particular test or suite of tests may be processed and analyzed by the analytics engine 158a to enable a developer to make a risk assessment as to incorporation of the new or modified code uploaded by one of the Scrums 154. That is, the analytics engine 158a may provide live analytics data that enable a developer to assess risk, add dependent component owners for review, and run only relevant testcases impacted by code that the developer has written.

With continued reference to FIG. 2, it can be seen that the core processing module 158 thus generates at least two different types of analytics, namely, development analytics that can be used by a developer for risk assessment and other purposes, and quality assurance (QA) analytics that can be employed for a variety of purposes. Particularly, the QA analytics may be used to ensure that new test cases identified by a developer are unique, and are not duplicates of existing test cases. In this way, addition of duplicate or unwanted testcases to the QA system is avoided. Finally, the QA analytics may thus result in a relatively faster execution cycle for the development of new code since, as disclosed herein, elements of the code development and implementation processes may be performed automatically.

As further indicated in FIG. 2, the core processing module 158 may communicate with data storage 160, such as MongoDB for example. In brief, MongoDB is a document-oriented database/database program. Other types of data storage may alternatively be employed however. Among other things, the data storage 160 may hold one or more code coverage maps 162. A code coverage map 162 may identify, for a program or application to which it pertains, the extent to which the executable code of the program or application is executed when a particular test, or suite of tests, is run. As noted elsewhere herein, the extent of code coverage may be expressed in a variety of different ways.

In association with one or more code coverage maps 162, a test case management platform 164 may be provided. The test case management platform 164 may provide, for example, bug tracking, issue tracking, and project management functions. One example of a test case management platform 164 is the JIRA software product developed by Atlassian, Inc. (https://www.atlassian.com/software/jira). Other test case management platforms can alternatively be used however.

Elements of an example test case management platform may include, for example, code line and function information that may be associated with one or more tests, test case and issue/error information, capabilities of tests, for example, insights expected from execution of a test, various use cases, and user stories that briefly identify a requirement of a particular application or code component. A story may be presented as an issue, and individual tasks of the story may be referred to as sub-tasks.

D. Example Host Configuration

Figure 3:
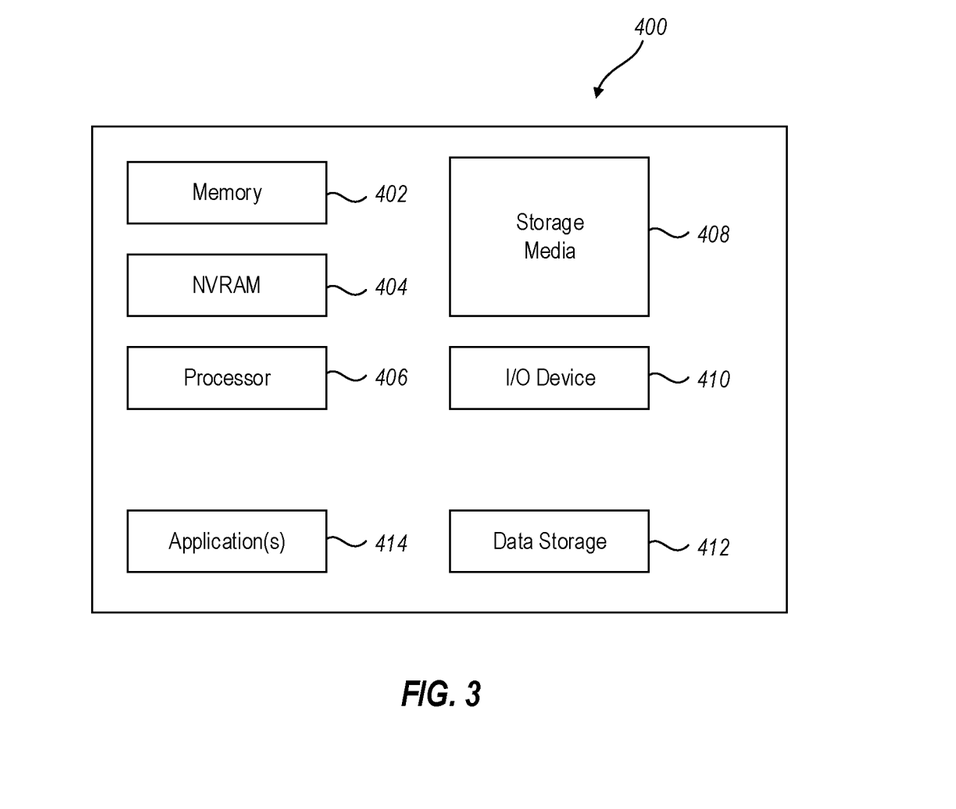
FIG. 3 discloses aspects of an example physical computing device configuration.

Turning briefly now to FIG. 3, any one or more of the development clients 102, code review environment 200, and test environment 300 can comprise, or consist of, a physical computing device, one example of which is denoted at 400. In the example of FIG. 1b, the physical computing device 400, which may be a host, includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take various forms including, for example, a developer application, a code review engine, and a test engine.

E. Aspects of Some Example Methods

Figure 4:
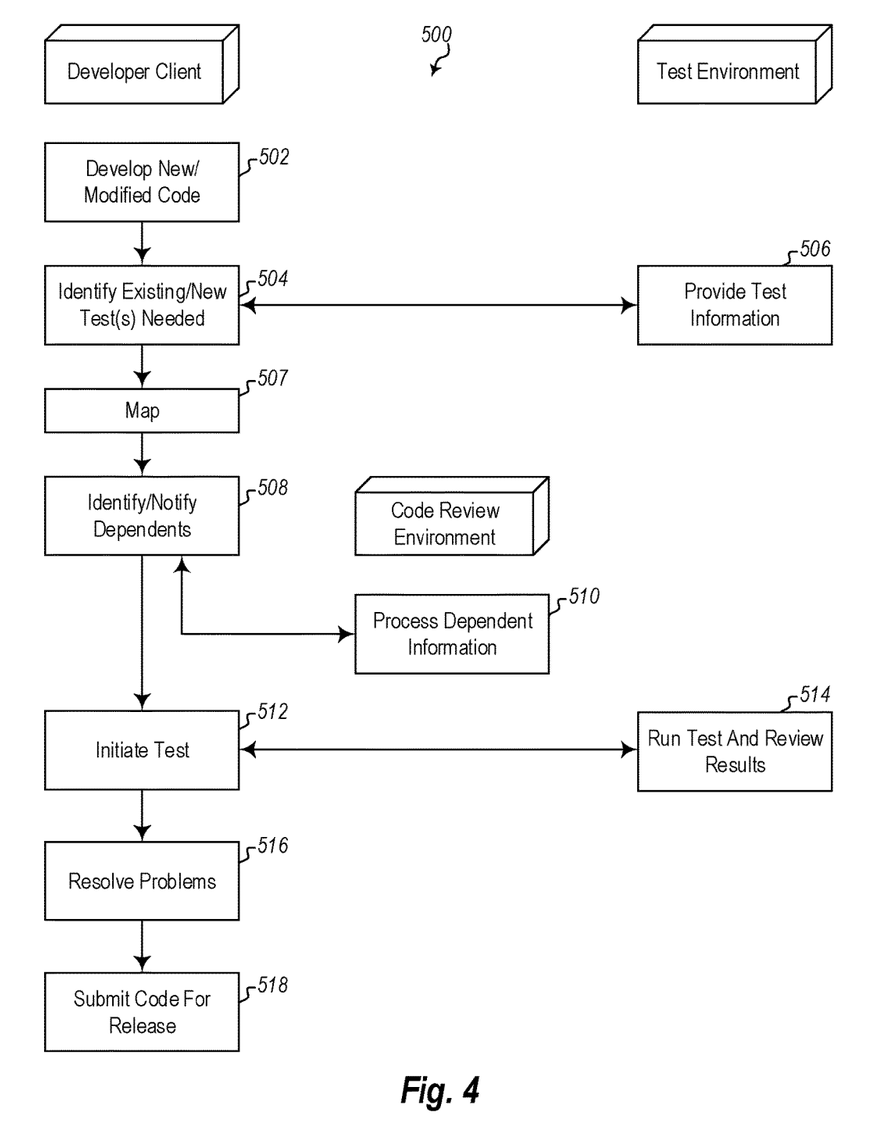
FIG. 4 is a flow diagram illustrating aspects of an example method for code risk assessment and resolution in a code development environment.

With attention now to FIG. 4, details are provided concerning some example methods for identifying and resolving potential problems concerning new or modified code in a code development environment, where one example of such a method is denoted generally at 500. The method 500 can be performed in an operating environment such as the example operating environment 100 in FIG. 1a, although no particular operating environment is necessarily required. In some embodiments at least, part or all of the method 500 can be performed by and/or in association with one or more of a developer client, code review environment, and a test environment. Multiple instances of the process 500 can be performed simultaneously, or in an overlapping manner, in connection with each of a plurality of respective code components. As well, at least some embodiments of the process 500 are performed in their entirety during a code development phase, prior to submission of the code for release.

The method 500 can begin when new or modified code is generated 502 at a developer client. When the code is completed, the code may be uploaded by a developer, which may be an element of a Scrum 154, to a code repository, such as the code repository 152 for example, any needed test(s) for that code is/are identified 504. The identified tests may be new or existing tests. In some embodiments, the information for new or existing tests can be supplied by the developer client to the test environment, such as information about tests that are needed for the new or modified code. Additionally, or alternatively, the test environment may provide test information 506, such as from a test library for example, to the developer client, such as information about tests that already exist and which may apply to the new or modified code.

The new or modified code is then mapped 507 to the test, or tests, that apply to the new or modified code. In at least some embodiments, the mapping of the test may involve the definition of a route path, which may take the form, for example of: "Usecase"→"component">"testcases"→"code line executed." This mapping information, which may be supplied by a developer to a core processing module 158 and/or other entity, can be used to create or modify a code coverage map, such as the coverage map 162 for example.

At 508, any dependents associated with the new or modified code are identified and notified. The identification and notification of the dependents can take place at the initiative of the developer client if the developer client is aware of the identity of the dependents or, alternatively, the code review environment can determine 510 the identity of the dependents based upon mapping information received from the developer client concerning the new or modified code, and the code review environment may then notify 510 the dependents. In this way, the developers of the dependent components are made aware of code that may affect the operation of those dependent components. In other embodiments, dependent information received from a developer may be associated with a code component by a core processing module 158 and, particularly, by an analytics engine 158a.

Next, the method 500 advances and the test to which the new or modified code has been mapped is initiated 512. In at least some embodiments, initiation 512 of the test is performed at the developer client, and involves transmission of a command to the test environment, which then runs the requested test and returns test results 514 to the developer client. In one alternative embodiment, a core processing module 158 may run one or more tests upon request by a developer.

Using the test result information, the developer client and/or a core processing module 158 can then identify and resolve 516 any problems in the new or modified code with which the test is associated. Once the problems have been resolved, the code may then be submitted 518 for release. Submission of the code may be performed by a developer.

With continued reference to FIG. 4, and directing attention again to FIG. 2, the respective functions attributed to the code review environment and the test environment in FIG. 4 may alternatively be consolidated together in an entity such as the core processing module 158 of FIG. 2.

F. Advantages of Example Embodiments

As will be apparent from this disclosure, embodiments of the invention may provide for various improvements and advantages relative to conventional methods. For example, some embodiments provide live analytics data that enable a developer to assess risk, add dependent component owners for review, and run only relevant testcases impacted by code that the developer has written. Embodiments may reduce, or eliminate, regression defects in complex development environments, such as multiple Scrum code development environments. As well, conventional processes do not provide a way to determine if a new test written is unique. However, in the present disclosure, when new testcases are added in the test environment, embodiments are able to provide information with regard to the validity of the test, for example, whether the test is a duplicate, or whether the test is unneeded because the route path involving the test would be the same as a route path for an existing testcase. Thus, such embodiments may save significant execution time by running only valid testcases for a particular code change. Finally, because embodiments of the invention may be implemented during the code development process, the likelihood that regression or other problems will be experienced after code is submitted for release is significantly reduced, or eliminated.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating application executable code by multiple developer clients including a first developer client and a second developer client, the method comprising:
   generating executable code by the first developer client, wherein the executable code corresponds to a first part of the application executable code;
   mapping a testcase to the executable code, the testcase being associated with a test;
   identifying a dependent code component based on the mapping of the testcase to the executable code, wherein the dependent code component is associated with executable code generated by a second developer client, wherein the dependent code component generated by the second developer client corresponds to a different part of the application executable code and is mapped to the testcase;
   notifying the second developer client of the dependent code component of a relation between the dependent code component and the executable code generated by the first developer client;
   initiating a test of the executable code generated by the first developer client; and
   identifying a problem, if any, between the executable code generated by the first developer client and the dependent code component generated by the second developer client, wherein the test allows the problem to be resolved before the application executable code is released.

2. The method as recited in claim 1, wherein the method is performed prior to submission of the executable code for release.

3. The method as recited in claim 1, wherein the test of the executable code generated by the first developer chart also tests the dependent code component.

4. The method as recited in claim 1, wherein a map of the test to the executable code generated by the first developer client is part of a path: usecase→component>testcases→code line executed.

5. The method as recited in claim 1, wherein the executable code generated by the first developer client is a line of executable code.

6. The method as recited in claim 1, wherein the test is verified as not being a duplicate of an existing test.

7. The method as recited in claim 1, wherein the dependent code component generated by the second client developer is dependent upon the executable code generated by the first developer client.

8. The method as recited in claim 1, further comprising resolving the problem in the executable code generated by the first developer client that was identified during the test or in the dependent code component.

9. The method as recited in claim 8, further comprising submitting the application executable code for release after the problem has been resolved.

10. A non-transitory storage medium having stored therein computer-executable instructions which, when executed by one or more hardware processors, perform a method for generating application executable code by the multiple developer client including a first developer client and a second developer client, the method comprising:

generated executable code by the first developer client, wherein the executable code corresponds to a first part of the application executable code;

mapping a testcase to the executable code generated by the first developer client, the testcase being associated with a test;

identifying a dependent code component based on the mapping of the testcase to the executable code, wherein the dependent code component is associated with executable code generated by a second developer client, wherein the dependent code component generated by the second developer client corresponds to a different part of the application executable code and is mapped to the testcase;

notifying the second developer client of the dependent code component of a relation between the dependent code component and the executable code generated by the first developer client;

initiating a test of the executable code generated by the first developer client; and identifying a problem, if any, between the executable code generated by the first developer client and the dependent code component generated by the second developer client, wherein the test allows the problem to be resolved before the application executable code is released.

11. The non-transitory storage medium as recited in claim 10, wherein the operations are performed prior to submission of the executable code for release.

12. The non-transitory storage medium as recited in claim 10, wherein the test of the executable code generated by the first developer client also tests the dependent code component.

13. The non-transitory storage medium as recited in claim 10, wherein a map of the test to the executable code generated by the first developer client is part of a path: usecase→component>testcases→code line executed.

14. The non-transitory storage medium as recited in claim 10, wherein the executable code generated by the first developer client is a line of executable code.

15. The non-transitory storage medium as recited in claim 10, wherein the test is verified as not being a duplicate of an existing test.

16. The non-transitory storage medium as recited in claim 10, wherein the dependent code component generated by the second client developer is dependent upon the executable code generated by the first developer client.

17. The non-transitory storage medium as recited in claim 10, wherein the operations further comprise resolving the problem in the executable code generated by the first developer client or in the dependent code component that was identified during the test.

18. The non-transitory storage medium as recited in claim 17, wherein the operations further comprise submitting the application executable code for release after the problem has been resolved.

19. A server comprising:
one or more hardware processors; and
the non-transitory storage medium as recited in claim 10.

* * * * *